United States Patent [19]

Slocum et al.

[11] Patent Number: 5,019,317

[45] Date of Patent: May 28, 1991

[54] PROCESS FOR THE PRODUCTION OF MOLDED PRODUCTS USING INTERNAL MOLD RELEASE AGENTS

[75] Inventors: Gregory H. Slocum, Pittsburgh; Donald W. Schumacher, Bethel Park, both of Pa.

[73] Assignee: Mobay Corporation, Pittsburgh, Pa.

[21] Appl. No.: 356,958

[22] Filed: May 24, 1989

[51] Int. Cl.$^5$ ............................................. B29C 45/00
[52] U.S. Cl. .................................. 264/300; 264/328.6; 264/328.18
[58] Field of Search ................ 264/328.1, 300, 328.6, 264/328.18; 521/124, 159; 528/60, 65, 74.5

[56] References Cited

U.S. PATENT DOCUMENTS

| | | | |
|---|---|---|---|
| 3,726,952 | 4/1973 | Boden et al. | 264/48 |
| 4,058,492 | 11/1977 | von Bonin et al. | 260/2.5 AM |
| 4,098,731 | 7/1978 | von Bonin et al. | 521/51 |
| 4,111,861 | 9/1978 | Godlewski | 521/123 |
| 4,201,847 | 5/1980 | Kleimann et al. | 521/172 |
| 4,254,228 | 3/1981 | Kleimann et al. | 521/128 |
| 4,256,848 | 3/1981 | Brizgys et al. | 521/124 |
| 4,499,254 | 2/1985 | Dominguez et al. | 528/49 |
| 4,519,965 | 5/1985 | Taylor et al. | 264/51 |
| 4,546,120 | 10/1985 | Peerman et al. | 528/60 |
| 4,581,386 | 4/1986 | Taylor et al. | 521/125 |
| 4,581,387 | 4/1986 | Werner et al. | 528/74.5 |
| 4,585,803 | 4/1986 | Nelson et al. | 521/105 |
| 4,722,803 | 2/1988 | Magnus et al. | 528/74.5 |
| 4,758,602 | 7/1988 | Trowell | 528/74.5 |
| 4,764,537 | 8/1988 | Horn et al. | 521/51 |
| 4,868,224 | 9/1989 | Harasin et al. | 264/328.6 |

FOREIGN PATENT DOCUMENTS 0119471 2/1984 European Pat. Off.
2101140 1/1983 United Kingdom.

Primary Examiner—Robert A. Dawson
Assistant Examiner—Allan R. Kuhns
Attorney, Agent, or Firm—Joseph C. Gil

[57] ABSTRACT

A process for producing a molded product by reacting an organic isocyanate component with an isocyanate reactive component. If the isocyanate component is based on a prepolymer of an isocyanate and a fatty acid ester, then the isocyanate reactive component must contain a fatty acid. Alternatively, if the isocyanate component contains a fatty acid, then the isocyanate reactive component must contain a zinc carboxylate. The system will release from bare steel.

7 Claims, No Drawings

PROCESS FOR THE PRODUCTION OF MOLDED PRODUCTS USING INTERNAL MOLD RELEASE AGENTS

BACKGROUND OF THE INVENTION

Internal mold release agents used in the production of molded polyurethane and polyurea products are known. U.S. Pat. Nos. 4,201,847 and 4,254,228 describe an internal mold release which is the reaction product of an organic polyisocyanate and an active hydrogen containing fatty acid ester. U.S. Pat. No. 4,111,861 describes four different classes of internal mold releases: i) mixtures of aliphatic or aryl carboxylic acid and a polar metal compound; ii) carboxyalkylsiloxanes; iii) aliphatic glyoximes; and, iv) aralkyl quaternary ammonium salts. Other known release agents include salts of acids (such as oleic acid) and primary amines (see, U.S. Pat. No. 3,726,952), reaction products of long chain fatty acids and ricinoleic acid (see, U.S. Pat. No. 4,058,492), and salts of acids (such as oleic acid) and tertiary amines (see, U.S. Pat. No. 4,098,731).

Zinc carboxylates containing from 8 to 24 carbon atoms per carboxylate group have also been described (U.S. Pat. Nos. 4,519,965, 4,581,386, 4,585,803 and 4,764,537, and British Patent 2,101,140). Release agents containing zinc carboxylates in combination with primary or secondary amine compatibilizers and an organic material containing a carboxylic acid group, a phosphorous containing acid group or a boron containing acid group, are described in published European Patent Application 0,119,471.

Most recently, a system which provides release from a bare metal mold has been developed. The system utilizes the reaction product of an organic polyisocyanate and an active hydrogen containing fatty acid ester in the A-side and a zinc carboxylate in the B-side (see, U.S. application Ser. No. 260,650, now U.S. Pat. No. 4,868,224 filed Oct. 21, 1988). One problem with this system is that the zinc carboxylate/solubilizer combination catalyzes the hydroxyl/isocyanate reaction. This makes the system relatively fast, leading to difficulties in filling large molds.

It is known to add fatty acids to polyurea systems in order to increase the green strength and aid in mold release (see, U.S. Pat. No. 4,499,254).

DESCRIPTION OF THE INVENTION

The present invention is directed to an improvement over the process described above which utilizes the isocyanate/fatty acid ester reaction product and zinc carboxylate combination. The reactivity of the overall system is reduced. At the same time, the system will release from a bare metal mold. More particularly, the present invention is directed to a process for producing a molded product comprising:

A) reacting:
  i) an organic isocyanate component selected from the group consisting of:
    a) an organic polyisocyanate having an isocyanate group content of from 5 to 45% by weight, preferably from 15 to 35% by weight, and most preferably from 20 to 35% by weight, prepared by reacting:
      1) an organic di- and/or polyisocyanate, and
      2) an active hydrogen containing fatty acid ester prepared by reacting an alcohol or a polyol with an aliphatic, saturated or unsaturated fatty acid, said ester being characterized in that at least one aliphatic acid which contains more than 8 carbon atoms is built into the molecule, said ester further characterized as having an acid number of from 0 to 100 and a hydroxyl number of from 0 to 150 with at least one of said numbers being greater than zero, said ester having an average molecular weight of from 500 to 5000, and
    b) a mixture of from about 2 to about 20% by weight of a fatty acid and from about 80 to about 98% by weight of an organic di- and/or polyisocyanate having an isocyanate group content of from about 20 to about 33% by weight, with
  ii) an isocyanate reactive component selected from the group consisting of
    a) a mixture comprising:
      1) from about 0.5 to about 10% by weight, based on the weight of components ii)a)2) and ii)a)3), of a zinc carboxylate containing from 8 to 24 carbon atoms per carboxylate group,
      2) from about 0.5 to 100% by weight, preferably from 0.5 to 95% by weight, more preferably from 5 to 45% by weight, and most preferably from 10 to 35% by weight, based on the weight of components ii)a)2) and ii)a)3), of a compatibilizer which compatibilizes said carboxylate in component ii)a), and
      3) 0 to about 99.5% by weight, preferably from 5 to 99.5% by weight, more preferably from 55 to 95% by weight, and most preferably from 65 to 90% by weight, based on the weight of components ii)a)2), and ii)a)3), of at least one hydroxyl group containing compound other than said compatibilizer,
    b) an isocyanate reactive mixture comprising from about 2 to about 50% by weight of a fatty acid and from about 50 to about 98% by weight of a hydroxyl group containing compound, with the proviso that when the isocyanate component is i)a), the isocyanate reactive component is ii)b) and when the isocyanate component is i)b), the isocyanate reactive component is ii)a), and with the further proviso that the components are reacted at an isocyanate index of from about 90 to about 400 and preferably from about 95 to about 115, in a closed mold,
B) allowing the components to react, and
C) removing the product from the mold.

It has been found that this particular combination of materials gives excellent release from a variety of different mold surfaces. It has been found that release from a bare metal mold, such as steel or aluminum, is possible without any pre-application of external mold release agent to the mold surface.

The fatty acid esters (component i)a)2)) useful herein are known and are described in U.S. Pat. Nos. 4,201,847 and 4,254,228, the disclosures of which are herein incorporated by reference.

Suitable fatty acid esters are those in which at least one aliphatic acid which contains more than 8 carbon atoms is built into the molecule and which have acid numbers of between 0 and 100, preferably between 0 and 40 and hydroxyl numbers between 0 and 150, preferably between 0 and 75, at least one of these two values being greater than 0.

The fatty acid esters used may also have the character of polyesters or mixed esters which may be prepared both from monofunctional and from polyfunctional carboxylic acids and/or alcohols.

The fatty acid esters may be prepared from several different types of fatty acids or carboxylic acids and/or alcohols or polyols. The fatty acid esters have an average molecular weight generally between 500 and 5,000 and preferably between 800 and 3,000.

Amines or amino alcohols may also be used in the preparation of the fatty acid esters to produce fatty acid mixed esters which contain basic or amide groups. Such mixed esters can be obtained, for example, by adding ammonia, monoalkylamines or dialkylamines or their alkoxylation products, for example with ethylene oxide, propylene oxide or higher epoxides or by using acid amides which contain carboxyl groups or alcohol groups. These acid amides may be obtained, for example, by the amidation of carboxylic acids with monoalkanolamines or dialkanolamines such as ethanolamine, diethanolamine, propanolamine, or dipropanolamine or the like.

The fatty acid esters used are preferably those which can be prepared by esterifying carboxylic acids with alcohols or polyols or which can be obtained from natural substrates. The following are examples of suitable alcohols and polyols: butanol, hexanol, octanol-isomers, dodecanol, oleyl alcohol, other fatty alcohols, natural or synthetic steroid alcohols, ricinoleic acid, ethylene glycol, propylene glycol, butanediols, hexanediols, glycerol, trimethylolpropane, pentaerythritol, sorbitol, hexitol, various sugars or addition products of alkylene oxides such as ethylene oxide or propylene oxide with these alcohols, and the like. Glycerol, trimethylolpropane, pentaerythritol and sorbitol are particularly suitable. The carboxylic acids used may be saturated or unsaturated and are preferably aliphatic, for example octane carboxylic acids, dodecane acids, natural fatty acids such as ricinoleic acid, oleic acid, alaidic acid, stearic acid, palmitic acid, linoleic acid, linolenic acid, train oil fatty acids, fatty acids obtained from coconut oil, tallow fatty acids or fatty acids obtained by paraffin oxidation, tall oil fatty acids, succinic acid, maleic acid, citric acid, azelaic acid, adipic acid or higher dicarboxylic and polycarboxylic acids, oligomerization products of unsaturated carboxylic acids and addition products of maleic acid with natural and synthetic oils, and the like. The following are particularly suitable: oleic acid, linoleic acid, ricinoleic acid and adipic acid.

Preparation of the fatty acid esters is most suitably carried out by the co-condensation of the alcohols or polyols and acid at temperatures above 100° C., preferably at 120° to 180° C., optionally in a vacuum, the process of the elimination of water being continued until the desired hydroxyl and acid numbers or average molecular weights have been obtained. The process of esterification may, of course, be catalyzed with acid or basic catalysts and the water may be eliminated by azeotropic distillation. The products prepared and used according to the invention contain hydroxyl and/or carboxylic acid groups.

Fatty acid esters which have been found to be particularly suitable for the process are the co-condensates of oleic acid with a dicarboxylic acid such as adipic acid and a polyfunctional alcohol, e.g. pentaerythritol, which have molecular weights of between 900 and 2500 and hydroxyl numbers of between 30 and 70 and acid numbers of between 3 and 30.

There is not always a direct stoichiometric connection between the acid numbers and hydroxyl numbers obtained and the molar ratio of the components used, possibly because side reactions of unknown type take place side by side with esterification.

Ricinoleic acid polyesters which have a molecular weight of between 800 and 2500 are also of particular interest.

Starting polyisocyanate components (as component i)a)1) and the isocyanate of component i)b)) include aliphatic, cycloaliphatic, araliphatic, aromatic and heterocyclic polyisocyanates of the type described, for example, by W. Siefken in Justus Liebigs Annalen der Chemie, 562, pages 72 to 136. Specific examples of these compounds are ethylene diisocyanate; 1,4-tetramethylene diisocyanate; 1,6-hexamethylene diisocyanate; 1,12-dodecane diisocyanate; cyclobutane-1,3-diisocyanate; cyclohexane-1,3- and -1,4-diisocyanate and mixtures of these isomers. Additional examples are 1-isocyanato-3,3,5-trimethyl-5-isocyanato-methyl cyclohexane (German Auslegeschrift No. 1,202,785, U.S. Pat. No. 3,401,190), 2,4- and 2,6-hexahydro-tolylene diisocyanate and mixtures of these isomers. Hexahydro-1,3- and/or -1,4-phenylene diisocyanate; perhydro-2,4'- and/or -4,4'-diphenylmethane diisocyanate; 1,3- and 1,4-phenylene diisocyanate; 1,4- and 2,6-tolylene diisocyanate and mixtures of these isomers are also suitable in the instant invention. Diphenylmethane-2,4- and/or -4,4'-diisocyanate; naphthylene-1, 5-diisocyanate; triphenyl methane-4,4',4''-triisocyanate; polyphenyl polymethylene polyisocyanates of the type obtained by condensing aniline with formaldehyde, followed by phosgenation and described, for example, in British Patent Nos. 874,430 and 848,671 may also be used in the present invention; m- and p-isocyanato-phenylsulfonyl isocyanates according to U.S. Pat. No. 3,454,606; perchlorinated aryl polyisocyanates of the type described, for example, in German Auslegeschrift No. 1,157,601 (U.S. Pat. No. 3,277,138); polyisocyanates containing carbodiimide groups of the type described in German Patent No. 1,902,007 (U.S. Pat. No. 3,152,162); diisocyanates of the type described in U.S. Pat. No. 3,492,330; and polyisocyanates containing allophanate groups of the type described, for example, in British Patent No. 993,890, in Belgian Patent No. 761,626 and in published Dutch Patent Application No. 7,102,524 are still further examples of suitable isocyanates. Additionally, polyisocyanates containing isocyanurate groups of the type described, for example, in U.S. Pat. No. 3,001,973; in German Patent Nos. 1,022,789; 1,222,067 and 1,027,394 and in German Offenlegungsschriften Nos. 1,929,034 and 2,004,408; polyisocyanates containing urethane groups of the type described, for example, in Belgian Patent No. 752,261 or in U.S. Pat. No. 3,394,164; polyisocyanates containing acylated urea groups according to German Patent No. 1,230,778 and polyisocyanates containing biuret groups of the type described, for example, in German Patent No. 1,101,394 (U.S. Pat. Nos. 3,124,605 and 3,201,372) and in British Patent No. 889,050 are also suitable.

Polyisocyanates produced by telomerization reactions of the type described, for example, in U.S. Pat. No. 3,654,106; polyisocyanates containing ester groups of the type described for example, in British Patent Nos. 965,474 and 1,072,956, in U.S. Pat. No. 3,567,763 and in German Patent No. 1,231,688; reaction products of the above-mentioned isocyanates with acetals according to German Patent No. 1,072,385 and polyisocyanates containing polymeric fatty acid residues, according to U.S. Pat. No. 3,455,883 are still further examples of suitable isocyanate.

Aromatic polyisocyanates which are liquid at the processing temperature are preferably used. The particularly preferred starting polyisocyanates include derivatives of 4,4'-diisocyanato-diphenylmethane which are liquid at room temperature, for example, liquid polyisocyanates containing urethane groups of the type obtainable in accordance with German Patent No. 1,618,380 (U.S. Pat. No. 3,644,457). These may be produced for example, by reacting 1 mol of 4,4'-diisocyanatodiphenylmethane with from 0.05 to 0.3 mols of low molecular weight diols or triols, preferably polypropylene glycols having a molecular weight below 700. Also useful are diisocyanates based on diphenylmethane diisocyanate containing carbodiimide and/or uretone imine groups of the type obtainable, for example, in accordance with German Patent No. 1,092,007 (U.S. Pat. No. 3,152,162). Mixtures of these preferred polyisocyanates can also be used. In general, aliphatic and cycloaliphatic isocyanates are less suitable for the purposes of the instant invention.

Also preferred are the polyphenyl-polymethylene polyisocyanates obtained by the phosgenation of an aniline/formaldehyde condensate. Where reinforcing fiber mats are used, it is particularly preferred that such polyisocyanates have viscosities of 200 mPa.s or less at 25° C.

Reaction of the fatty acid ester or mixtures of fatty acid esters with the polyisocyanates is generally carried out by mixing the fatty acid ester with the polyisocyanate and reacting the components at temperatures between 20° C. and 200° C., preferably between 20° C. and 95° C., optionally with stirring. Lower reaction temperatures could also in principle be used but the length of time which would then be required for complete reaction of the components to obtain suitable reaction products for the process would be uneconomical. Although the reaction could be accelerated by means of catalysts, this should be avoided in order to prevent as far as possible any deleterious effect on the reactivity of the polyisocyanate components during the subsequent production of the molded product.

The molar ratio of active hydrogen atoms to isocyanate groups in the reaction of the fatty acid ester with the polyisocyanate is generally maintained between 1:1.1 and 1:25. The reaction products are frequently prepared by reacting a mixture of 0.5 to 25% by weight, (preferably 2 to 18% by weight) of fatty acid esters and 99.5 to 75% by weight (preferably 98 to 82% by weight) of polyisocyanate at a temperature of between 20° C. and 200° C. Prereaction in excess polyisocyanate results in a product which can be used directly ("modified" polyisocyanate).

The reaction products of polyisocyanates and fatty acid esters may also be prepared separately and later diluted with an additional quantity of polyisocyanate which may be a different polyisocyanate. Regardless of how the product is prepared, the isocyanate component (i)a)) generally has an isocyanate group content of from 5 to 45% by weight, preferably from 15 to 35% by weight, and most preferably from 20 to 35% by weight.

The suitable zinc carboxylates (component ii)a)1) which may be used in the present invention are based on $C_8$–$C_{24}$, branched or straight chain fatty acids which may be saturated or unsaturated. The carboxylates also include the commercial preparations of a specific carboxylate which also contains impurities or by-products of other fatty acid derivatives. For example, commercial "stearates" may also contain significant quantities of palmitates, myrisates, etc. and commercial "tall oil" derivatives normally contain mixtures of stearates, palmitates, oleates, etc. Examples of specific zinc carboxylates include zinc stearate, zinc oleate, zinc octoate, zinc laurate, zinc behenate, zinc ricinoleate and the like.

The preferred zinc carboxylates are those which remain soluble in combination with the compatibilizer when in admixture with the isocyanate-reactive components. The most preferred zinc carboxylates are zinc laurate and zinc stearate, and especially those zinc stearates, having a high purity such as Zinc Stearate Polymer Grade Type N from Witco, Zinc Stearate RSN 131 HS and IPS from Mallinckrodt and Zinc Stearate Heat Stable Polymer Grade from Nuodex. The zinc carboxylates are used in amounts of about 0.5 to 10%, preferably about 1 to 6% and most preferably about 1 to 5%, by weight, based on the weight of all the isocyanate reactive components.

Suitable compatibilizers are those which assist in compatibilizing or solubilizing the zinc carboxylates in the compound(s) containing hydroxyl groups without substantially affecting the processing characteristics of the reaction mixture or the physical properties or paintability of the molded articles produced therefrom. In general, such compatibilizers will compatibilize the zinc carboxylate in the hydroxyl containing compound(s) but will not compatibilize the zinc carboxylate in the reacting mixture. Suitable compatibilizers are described in U.S. Pat. Nos. 4,519,965, 4,581,386, 4,585,803 and 4,764,537, and in U.S. application Ser. Nos. 239,153 and 239,366, both filed Aug. 31, 1988, 241,529, filed Sept. 7, 1988, and 243,522, filed Sept. 12, 1988, all the disclosures of which are herein incorporated by reference.

The preferred compatibilizers include nitrogen-containing, isocyanate-reactive, acyclic compounds such as aliphatic polyamines and nitrogen-containing isocyanate-reactive polymers, preferably polyethers. Preferred compatibilizers include polyether polyamines and amine- or hydroxyl-terminated, amine-initiated polyethers (i.e., polyethers obtained by the addition of alkylene oxides such as ethylene oxide and/or propylene oxide to aromatic or aliphatic polyamines, optionally followed by amination). Specific examples of these nitrogen-containing, isocyanate-reactive polymers include polyoxypropylene diamine (supplied as Jeffamine D-230 from Texaco), polyoxypropylene diamine (supplied as Jeffamine D-400 from Texaco), polyoxypropylene diamine (supplied as Jeffamine D-2000 from Texaco), polyoxypropylene triamine (supplied as Jeffamine T-403 from Texaco), polyoxypropylene triamine (supplied as Jeffamine T-5000 from Texaco), an ethylene diamine-based polyether polyol (supplied as Multranol 4050 from Mobay) and toluene diamine-based polyether polyols (supplied as Multranol 9136 and 9166 from Mobay).

Even though any of the previously described compounds or polymers assist in compatibilizing or solubilizing the zinc carboxylates in the hydroxyl containing material, it has been found that the amine- or hydroxyl-terminated, amine-based polyethers provide long term stability of the zinc carboxylates, especially zinc stearates and zinc laurates without a gradual precipitation of the zinc stearates taking place. The amine-based polyethers provide this increased storage stability when they are used as the sole compatibilizing or solubilizing agent or when they are used in combination with the nitrogen-containing, isocyanate-reactive, acyclic compounds or, especially, the polyether polyamines.

Preferred amine-based polyethers are those initiated with an amine containing at least two nitrogens and which contain the group —N—C—C—N, i.e. wherein there are two carbons between the nitrogens. Examples of these amines include aliphatic amines such as ethylene diamine, diethylene triamine, etc. and heterocyclic amines such as piperazine or imidazolidine. Especially preferred are the alkoxylation products, preferably ethoxylation products and more preferably the propoxylation products of ethylene diamine such as the previously described Multranol 4050.

The amount of compatibilizer is generally dependent on the type of compatibilizer used. When the compatibilizer contains active hydrogen groups, it can be used in amounts of from 0.5 to 100% by weight, preferably from 0.5 to 95% by weight, more preferably from 5 to 45% by weight, and most preferably from 10 to 35% by weight, based on the total weight of all the active hydrogen containing compounds (including the compatibilizer). When the compatibilizer does not contain active hydrogen groups, it can be used in amounts of from 0.5 to 10% by weight, and preferably from 1 to 6% by weight, based on the weight of active hydrogen containing compounds present.

Regardless of the compatibilizer chosen, it should be used in an amount which is sufficient to solubilize the zinc carboxylate so that the zinc carboxylate possesses improved resistance to precipitation.

Also necessary for preparing the molded product of the present invention is an isocyanate reactive component. As noted earlier, the isocyanate reactive component can consist of 100% by weight of compatibilizer. However, it is generally preferred to include hydroxyl group containing compounds. These materials may be typically divided into two groups, high molecular weight compounds having a molecular weight of 400 to about 10,000 and low molecular weight compounds, i.e. chain extenders, having a molecular weight of 62 to 399. Examples of suitable high molecular weight compounds include the polyesters, polyethers, polythioethers, polyacetals and polycarbonates containing at least 2, preferably 2 to 8 and most preferably 2 to 4 hydroxyl groups of the type known for the production of polyurethanes.

The high molecular weight polyethers suitable for use in accordance with the invention are known and may be obtained, for example, by polymerizing epoxides such as ethylene oxide, propylene oxide, butylene oxide, tetrahydrofuran, styrene oxide or epichlorohydrin in the presence of $BF_3$ or by chemically adding these epoxides, preferably ethylene oxide and propylene oxide, in admixture or successively to components containing reactive hydrogen atoms such as water, alcohols or amines. Examples of alcohols and amines include the low molecular weight chain extenders set forth hereinafter, 4,4'-dihydroxy diphenyl propane, sucrose, aniline, ammonia, ethanolamine and ethylene diamine. It is preferred to use polyethers which contain substantial amounts of primary hydroxyl groups in terminal positions (up to 90% by weight, based on all of the terminal hydroxyl groups present in the polyether). Polyethers modified by vinyl polymers, of the type formed, for example, by polymerizing styrene or acrylonitrile in the presence of polyether (U.S. Pat. Nos. 3,383,351; 3,304,273; 3,523,093; and 3,110,695; and German Patent 1,152,536), are also suitable, as are polybutadienes containing OH groups.

In addition, polyether polyols which contain high molecular weight polyadducts or polycondensates in finely dispersed form or in solution may be used. Such modified polyether polyols are obtained when polyaddition reactions (e.g., reactions between polyisocyanates and amino functional compounds) or polycondensation reactions (e.g., between formaldehyde and phenols and/or amines) are directly carried out in situ in the polyether polyols.

Suitable examples of high molecular weight polyesters include the reaction products of polyhydric, preferably dihydric alcohols (optionally in the presence of trihydric alcohols), with polyvalent, preferably divalent, carboxylic acids. Instead of using the free carboxylic acids, it is also possible to use the corresponding polycarboxylic acid anhydrides or corresponding polycarboxylic acid esters of lower alcohols or mixtures thereof for producing the polyesters. The polycarboxylic acids may be aliphatic, cycloaliphatic, aromatic, and/or heterocyclic and may be unsaturated or substituted, for example, by halogen atoms. The polycarboxylic acids and polyols used to prepare the polyesters are known and described for example in U.S. Pat. No. 4,098,731 and 3,726,952, herein incorporated by reference in their entirety. Suitable polythioethers, polyacetals, polycarbonates and other polyhydroxyl compounds are also disclosed in the above identified U.S. patents. Finally, representatives of the many and varied compounds which may be used in accordance with the invention may be found for example in High Polymers, Volume XVI, "Polyurethanes, Chemistry and Technology," by Saunders-Frisch, Interscience Publishers, New York, London, Vol. I, 1962, pages 32–42 and 44–54, and Volume II, 1964, pages 5–6 and 198–199; and in Kunststoff-Handbuch, Vol. VII, Vieweg-Hochtlen, Carl Hanser Verlag, Munich, 1966, pages 45–71.

The hydroxyl group containing materials described are also used as the component to be mixed with the fatty acid (i.e., component ii)b)).

In accordance with the present invention, the high molecular weight compounds can be used in admixture with up to about 95% by weight based on the total quantity of active hydrogen containing compounds, of low molecular weight chain extenders. Examples of suitable hydroxyl group-containing chain extenders include ethylene glycol, 1,2- and 1,3-propane diol, 1,3- and 1,4- and 2,3-butane diol, 1,6-hexane diol, 1,10-decane diol, diethylene glycol, triethylene glycol, tetraethylene glycol, dipropylene glycol, tripropylene glycol, glycerol and trimethylol propane.

Other suitable chain extenders include aromatic polyamines, preferably diamines, having molecular weights of less than 400, especially the sterically hindered aromatic polyamines, preferably diamines, having molecular weights of less than 400, especially the sterically hindered aromatic diamines which contain at least one linear or branched alkyl substituent in the ortho-position to the first amino group and at least one, preferably two linear or branched alkyl substituents containing from 1 to 4, preferably 1 to 3, carbon atoms in the orthoposition to a second amino group. These aromatic diamines include 1-methyl-3,5-diethyl-2,4-diamino benzene, 1-methyl-3,5-diethyl-2,6-diamino benzene, 1,3,5-trimethyl-2,4-diamino benzene, 1,3,5-triethyl-2,4-diamino benzene, 3,5,3',5'-tetraethyl-4,4'-diamino diphenylmethane, 3,5,3',5'-tetraisopropyl-4,4'-diamino diphenylmethane, 3,5-diethyl-3',5'-diisopropyl-4,4'-diamino diphenylmethane, 3,5-diethyl-5,5'-diisopropyl-4,4'-diamino diphenylmethane, 1-methyl-2,6-diamino-3-isopropylbenzene and mixtures of the above diamines. Most preferred are mixtures of 1-methyl-3,5-diethyl-2,4-diamino benzene and 1-methyl-3,5-diethyl-2,6-diamino benzene in a weight ratio between about 50:50 to 85:15, preferably about 65:35 to 80:20.

In addition, aromatic polyamines may be used in admixture with the sterically hindered chain extenders and include, for example, 2,4- and 2,6-diamino toluene, 2,4'- and/or 4,4'-diamino-diphenyl-methane, 1,2- and 1,4-phenylene diamine, naphthalene-1,5-diamine and triphenylmethane-4,4',4''-triamine. The difunctional and polyfunctional aromatic amine compounds may also exclusively or partly contain secondary amino groups such as 4,4'-di-(methylamino)-diphenylmethane or 1-methyl-2-methylamino-4-amino-benzene. Liquid mixtures of polyphenyl polymethylene-polyamines, of the type obtained by condensing aniline with formaldehyde, are also suitable. Generally, the non-sterically hindered aromatic diamines and polyamines are too reactive to provide sufficient processing time in a RIM system. Accordingly, these diamines and polyamines should generally be used in combination with one or more of the previously mentioned sterically hindered diamines or hydroxyl group-containing chain extenders.

It is particularly preferred to utilize the hydroxyl group containing composition described in U.S. Pat. No. 4,792,576. Such composition broadly comprises
(i) at least one polyether polyol having a hydroxy functionality of from 2 to 8, preferably 2 to 4, and a molecular weight of from 350 to below 1800, preferably from 350 to 1100, and
(ii) at least one hydroxyl functional organic material containing from 2 to 8 hydroxyl groups, preferably 2 or 3 and having a molecular weight of below 350, components i) and ii) being used in a weight ratio of i) to ii) of from about 10:1 to about 1:10, and
(iii) no more than 45% by weight based on the total weight of component (i), (ii) and (iii), of an active hydrogen containing compound having a molecular weight of 1800 or more.

Further details as to the above composition can be found in the above-identified U.S. patent.

Essential to the present invention is the fatty acid which is used either in the A-side or in the B-side of the system. Useful fatty acids include those described above for use in preparing the fatty acid esters. Also useful are those fatty acids described in U.S. Pat. No. 4,499,254. Typical are those acids represented by the formula: $R(CO_2H)n$, where n is 1, 2, or 3, and where R contains at least 10 carbon atoms. R may be alkyl (cyclic, linear or branched), alkaryl, aralkyl, or aryl, saturated or unsaturated. Examples of useful acids include n-decanoic acid, neodecanoic acid, sebacic acid, undecanoic acid, dodecanoic acid, lauric acid, palmitic acid, stearic acid, isostearic acid, oleic acid, linoleic acid, and the like. Regardless of whether the acid is used in the A-side or in the B-side, it is merely mixed with the particular component prior to use. The relative amounts of fatty acid used are as described above.

Other additives which may be used in the present invention include catalysts, especially tin(II) salts of carboxylic acids, dialkyl tin salts of carboxylic acids, dialkyl tin mercaptides, dialkyl tin dithioesters and tertiary amines. Preferred among these catalysts are dibutyl tin dilaurate and 1,4-diazabicyclo-(2,2,2)-octane (triethylene diamine), especially mixtures of these catalysts. The catalysts are generally used in amounts of about 0.01 to 10%, preferably about 0.05 to 2%, based on the weight of the isocyanate reactive component. In some instances, such as where the compatibilizer contains tertiary amine groups, no additional catalyst may be necessary.

It is also possible to use surface-active additives such as emulsifiers and foam stabilizers. Examples include N-stearyl-N',N'-bis-hydroxyethyl urea, oleyl polyoxyethylene amide, stearyl diethanol amide, isostearyl diethanolamide, polyoxyethylene glycol monoleate, a pentaerythritol/adipic acid/oleic acid ester, a hydroxy ethyl imidazole derivative of oleic acid, N-stearyl propylene diamine and the sodium salts of castor oil sulfonates or of fatty acids. Alkali metal or ammonium salts of sulfonic acid such as dodecyl benzene sulfonic acid or dinaphthyl methane sulfonic acid and also fatty acids may also be used as surface-active additives.

Suitable foam stabilizers include water-soluble polyether siloxanes. The structure of these compounds is generally such that a copolymer of ethylene oxide and propylene oxide is attached to a polydimethyl siloxane radical. Such foam stabilizers are described in U.S. Pat. No. 2,764,565. In addition to the catalysts and surface-active agents, other additives which may be used in the molding compositions of the present invention include known blowing agents, cell regulators, flame retarding agents, plasticizers, dyes, fillers and reinforcing agents such as glass in the form of fibers or flakes or carbon fibers.

The molded products of the present invention are prepared by reacting the components in a closed mold. The compositions according to the present invention may be molded using conventional processing techniques at isocyanate indexes ranging from as low as 90 to as high as 400 (preferably from 95 to 115) and are especially suited for processing by the RIM process. In general, two separate streams are intimately mixed and subsequently injected into a suitable mold, although it is possible to use more than two streams. The first stream contains the polyisocyanate component, while the second stream contains the isocyanate reactive components and any other additive which is to be included.

The invention is further illustrated but is not intended to be limited by the following examples in which all parts and percentages are by weight unless otherwise specified.

EXAMPLES

In the examples which follow, the following materials were used:

ACID: a commercially available mixture of organic acids containing about 33% by weight of oleic acid, about 35% by weight of linoleic acid, and about 20% of linolenic acid, available from Witco Corporation as Industrene 224.

ZNS: zinc stearate.

COMPATIBILIZER: a 356 molecular weight ethylene diamine/propylene oxide adduct.

POLYOL: a 425 molecular weight polypropylene glycol.

EG: ethylene glycol.

33LV: a 33% solution of triethylene diamine in dipropylene glycol.

ISO: a polymethylenepoly(phenyl isocyanate) containing about 58% by weight of diisocyanate, having a viscosity at room temperature of about 50 cps, and having an NCO content of about 32% by weight.

PREPOLYMER A: 95 parts by weight of ISO were weighed into a drum. 5 parts of a fatty acid ester (the reaction product of 6 moles of oleic acid, 1 mole of adipic acid, and 2.5 moles of pentaerythritol, having an OH number of about 51 and an equivalent weight of about 1050) were added to the drum with high speed mixing. The mixture was stirred for about 30 minutes at room temperature. The resultant prepolymer had an equivalent weight of 136, and a viscosity at room temperature of 65 cps.

PREPOLYMER B: 95 parts by weight of ISO were weighed into a round bottom flask and heated under a nitrogen blanket to 60° C. 5 parts by weight of ACID were added under agitation and the mixture was stirred for 1 hour at 60–70 C. The resulting prepolymer had an equivalent weight of 140. At room temperature it was gelatinous and non-homogeneous, but when heated to 35°–40° C., it became a uniform, pourable liquid.

EXAMPLE 1

A B-side was prepared by mixing 50 parts by weight of POLYOL, 30 parts by weight of EG, 20 parts by weight of COMPATIBILIZER, 0.5 parts by weight of 33LV and 5 parts by weight of ACID. The A-side consisted of PREPOLYMER A. The two sides were run on a Hennecke Rimdomat machine, using a 10 mm KM mixhead. The mixture was injected into a large steel mold (1 meter × 2 meter × 3 mm thick) held in a 600 ton Cannon shuttle bed press. Material temperatures were held at 90° F. and the mold cavity was held at 170° F. The components were mixed at a weight ratio of 188 parts of A-side to 100 parts of B-side at impingement pressures of about 1500 psi. The mold was cleaned prior to injection with an N-methyl pyrrolidone based cleaner. Two layers of 2 oz/ft$^2$ continuous strand fiberglass mat (available from OCF and sold as M-8610) were placed in the mold. After 4 minutes, the part was demolded with no residual material left on the mold cavity surface. The first plaque released with some difficulty. The second plaque released somewhat easier. Subsequent plaques released easily.

EXAMPLE 2

A B-side was prepared by mixing 50 parts of POLYOL, 30 parts of EG, 20 parts of COMPATIBILIZER, 0.5 parts of 33LV, and 4 parts of ZNS. The A-side consisted of PREPOLYMER B. About 30 parts of B-side were mixed with 59 parts of A-side in a small paper cup using a tongue depressor. The mixture was poured into a 6"×6"×⅛" steel mold, which had been heated to 140° F. and which contained 3 oz/sq. ft OCF-M8610. The top surface of the mold had been waxed a commercial paste mold release (Chemtrend CT-2006) and the other surface was cleaned with a N-methyl pyrrolidone mold cleaner (Chemtrend CT-201). The mold was clamped shut. After 2 minutes, the mold was opened and the part removed. Although the initial release from the bare metal required some effort, the second release was much easier, and subsequent releases were practically effortless.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A process for producing a molded product comprising:
   A) reacting:
      i) an organic isocyanate component selected from the group consisting of:
         a) an organic polyisocyanate having an isocyanate group content of from 5 to 45% by weight, prepared by reacting:
            1) an organic di- and/or polyisocyanate, and
            2) an active hydrogen containing fatty acid ester prepared by reacting an alcohol or a polyol with an aliphatic, saturated or unsaturated fatty acid, said ester being characterized in that at least one aliphatic acid which contains more than 8 carbon atoms is built into the molecule, said ester further characterized as having an acid number of from 0 to 100 and a hydroxyl number of from 0 to 150 with at least one of said numbers being greater than zero, said ester having an average molecular weight of from 500 to 5000, and
         b) a mixture of from about 2 to about 20% by weight of a fatty acid and from about 80 to about 98% by weight of an organic di- and/or polyisocyanate having an isocyanate group content of from about 20 to about 33% by weight, with
      ii) an isocyanate reactive component selected from the group consisting of
         a) a mixture comprising:
            1) from about 0.5 to about 10% by weight, based on the weight of components ii)a)2) and ii)a)3), of a zinc carboxylate containing from 8 to 24 carbon atoms per carboxylate group,
            2) from about 0.5 to 100% by weight, based on the weight of components ii)a)2) and ii)a)3), of a compatibilizer which compatibilizes said carboxylate in component ii)a), and
            3) from 0 to about 99.5% by weight, based on the weight of components ii)a)2), and ii)a)3), of at least one hydroxyl group containing compound other than said compatibilizer,
         b) an isocyanate reactive mixture comprising from about 2 to about 50% by weight of a fatty acid and from about 50 to about 98% by weight of a hydroxyl group containing compound, with the proviso that when the isocyanate component is i)a), the isocyanate reactive component is ii)b) and when the isocyanate component is i)b), the isocyanate reactive component is ii)a), and with the further proviso that the components are reacted at an isocyanate index of from about 90 to about 400 in a closed mold,
   B) allowing the components to react, and
   C) removing the product from the mold.

2. The process of claim 1 wherein component i)a) has an isocyanate group content of from 15 to 35% by weight.

3. The process of claim 2 wherein component i)a) has an isocyanate group content of from 20 to 35% by weight.

4. The process of claim 1 wherein component ii)a)2) is used in an amount of from 0.5 to 95% by weight and component ii)a)3) is used in an amount of from 5 to 99.5% by weight.

5. The process of claim 4 wherein component ii)a)2) is used in an amount of from 5 to 45% by weight and component ii)a)3) is used in an amount of from 55 to 95% by weight.

6. The process of claim 5 wherein component ii)a)2) is used in an amount of from 10 to 30% by weight and component ii)a)3) is used in an amount of from 65 to 90% by weight.

7. The process of claim 1 wherein the isocyanate index is from 95 to 115.

* * * * *